United States Patent
Lei (10) Patent No.: US 12,498,231 B2
(45) Date of Patent: Dec. 16, 2025

(54) CHARGING RESERVATION AND ROUTE PLANNING WITH LOAD BALANCING

(71) Applicant: FORD GLOBAL TECHNOLOGIES, LLC, Dearborn, MI (US)

(72) Inventor: Oliver Lei, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 228 days.

(21) Appl. No.: 18/178,218

(22) Filed: Mar. 3, 2023

(65) Prior Publication Data
US 2024/0295407 A1 Sep. 5, 2024

(51) Int. Cl.
G01C 21/34 (2006.01)
B60L 58/12 (2019.01)
G01C 21/36 (2006.01)

(52) U.S. Cl.
CPC .......... *G01C 21/3461* (2013.01); *B60L 58/12* (2019.02); *G01C 21/3469* (2013.01); *G01C 21/3605* (2013.01)

(58) Field of Classification Search
CPC ............ G01C 21/3461; G01C 21/3469; G01C 21/3605; B60L 58/12
See application file for complete search history.

(56) References Cited

U.S. PATENT DOCUMENTS

| | | | |
|---|---|---|---|
| 10,809,085 B2 | 10/2020 | North et al. | |
| 2015/0226572 A1* | 8/2015 | North | B60L 53/68 |
| | | | 701/400 |
| 2016/0264013 A1* | 9/2016 | Kim | B60L 53/63 |
| 2018/0143029 A1* | 5/2018 | Nikulin | G01C 21/3415 |
| 2018/0364738 A1* | 12/2018 | Bridges | G05D 1/0217 |
| 2019/0316924 A1* | 10/2019 | Morgan-Brown | G01C 21/3697 |

FOREIGN PATENT DOCUMENTS

| CN | 114537205 A | 5/2022 |
|---|---|---|
| NO | 2022159952 A1 | 7/2022 |

* cited by examiner

*Primary Examiner* — Joan T Goodbody
*Assistant Examiner* — Godfrey Aleksander Maciorowski
(74) *Attorney, Agent, or Firm* — Joseph Zane; Brooks Kushman P.C.

(57) ABSTRACT

A method includes determining that at least two charging stops are projected to be required to complete travel along a planned route and determining a reachable first charging stop, within a first predefined proximity of the planned route. The method also includes determining one or more second charging stops, within a second predefined proximity of the planned route and reachable from the first charging stop, and for each second charging stop, determining a minimum charge required to reach a respective second charging stop. The method additionally includes determining which of the second charging stops are achievable, based on the minimum vehicle charge required and whether the minimum vehicle charge can be achieved through charging at the first charging stop. The method further includes reserving charging at the first charging stop and modifying the planned route to include stops at the first charging stop and the selected achievable second charging stop.

12 Claims, 3 Drawing Sheets

CHARGING RESERVATION AND ROUTE PLANNING WITH LOAD BALANCING

TECHNICAL FIELD

The illustrative embodiments generally relate to charging reservation and route planning with load balancing.

BACKGROUND

Electric vehicles (EVs) are becoming more popular choices for personal vehicles, and offer many advantages over a traditional fuel-based vehicle. Due to the recency of these vehicles, however, one area in which EVs tend to lag behind is in available charging locations. Perhaps because many EVs can complete daily travel without having to recharge, since the owners can recharge many such vehicles at home, the infrastructure to support on-demand EV charging at a level comparable to the availability of gasoline refueling has not yet been established. Yet, as the number of EV owners continue to grow, solutions for proper EV station usage and awareness need to evolve until the infrastructure can reach a tipping point.

Another issue with EV charging is that it often may take more time than a typical gasoline refueling session, leading to longer wait times at a charging point for available bays. This has led the industry to experiment with time reservations, which assure a customer of a slot at or within a certain time and serve to let others better plan for the availability, or lack thereof, of charging resources.

Even with reservations, however, certain areas with high-demand for charging may simply experience overloaded usage. For example, in a rural area where two major highways interchange, there may be great demand for charging because of the relative distance from any other options. Passersby may often be engaged in long journeys, and may mostly be far away from personal or private recharging options. In such stations, it might be preferable if users would only take as much power as they needed to get to an alternative charging option, but people may not always cooperate. Also, some users who are planning on using the station may arrive only to find they must wait several hours for a charging slot. Had those users known this in advance, and to the extent possible, they may have delayed the start of a journey, especially if the wait was essentially inevitable. In other cases, those users may elect to pre-charge (spend a longer time) at a less-used station prior to the heavily used station, in order to bypass the heavily used station entirely. That may involve charging a vehicle at 80 state of charge (SOC) to 100 percent 30 minutes into a journey, which may be thought of as atypical behavior, but most people would do this if they knew that it would save them a 2 hour wait at some point along their path.

In the absence of planning and knowledge, people are left to guess as to the best solutions, or chance long delays if they do not attempt to overcompensate early, and either strategy is likely to lead to highly inefficient utilization of common resources. But, without knowledge, planning and cooperation for resource usage, such an outcome is the likely result.

SUMMARY

In a first illustrative embodiment, a system includes one or more processors configured to determine that a current vehicle charge of a vehicle is insufficient to complete a planned route from a current location of a vehicle to a destination of the planned route based on a determined total amount of charge required. The processors are also configured to determine that a plurality of recharges are projected to be required to reach the destination and, responsive to determining that the plurality of recharges are projected to be required, determine at least one path including the planned route and deviations to a plurality of known charging stations within a predefined proximity to the planned route. Further, the one or more processors are configured to determine, for at least one path, whether charging is available, at each respective charging station included in the path, within a predefined time window from an estimated time of arrival of the vehicle at each respective charging station and whether sufficient charge will exist, following charging at each respective charging station during available charging, to reach a next point on the at least one path, the next point being at least one of a next charging station or the destination. The one or more processors are additionally configured, responsive to a determination that charging is available at each respective charging station within the predefined time window and that sufficient charge will exist following charging to reach each next point and the destination, for a first path of the at least one paths, reserve the charging determined to be available for each respective station on the first path and generating a new planned route based on the first path.

In a second illustrative embodiment, a method includes determining that at least two charging stops are projected to be required to complete travel along a planned route and determining a first charging stop, within a first predefined proximity of the planned route and reachable based on a current charge of a vehicle. The method also includes determining one or more second charging stops, within a second predefined proximity of the planned route and reachable from the first charging stop based on at least a maximum usable charge of the vehicle, and for each second charging stop, determining a minimum vehicle charge required to reach a respective second charging stop from the first charging stop. The method additionally includes determining which of the one or more second charging stops are achievable, based on the minimum vehicle charge required for each of the respective second charging stops and whether the minimum vehicle charge can be achieved by the vehicle through charging at the first charging stop using a reservation window available at the first charging stop and selecting one of the achievable second charging stops. The method further includes reserving charging at the first charging stop during the reservation window for at least a duration projected to be sufficient to achieve the minimum vehicle charge required to reach the selected achievable second charging stop and modifying the planned route to include stops at the first charging stop and the selected achievable second charging stop.

In a third illustrative embodiment, a non-transitory computer-readable storage medium stores instructions that, when executed by a processor, cause the processor to perform a method including: a) determining that at least two charging stops are projected to be required to complete travel along a planned route and b) determining a first charging stop, within a first predefined proximity of the planned route and reachable based on a current charge of a vehicle. The method also includes c) determining one or more second charging stops, within a second predefined proximity of the planned route and reachable from the first charging stop based on at least a maximum usable charge of the vehicle and d) for each second charging stop, determining a minimum vehicle charge required to reach a respective second charging stop from the first charging stop. Further, the method includes e) determining which of the one or more second charging stops are achievable, based on the minimum vehicle charge required for each of the respective second charging stops and whether the minimum vehicle charge can be achieved by the vehicle through charging at the first charging stop using a reservation window available at the first charging stop. The method also includes f) selecting one of the achievable second charging stops and g) reserving charging at the first charging stop during the reservation window for at least a duration projected to be sufficient to achieve the minimum vehicle charge required to reach the selected achievable second charging stop. The method includes h) modifying the planned route to include stops at the first charging stop and the selected achievable second charging stop.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

In addition to having exemplary processes executed by a vehicle computing system located in a vehicle, in certain embodiments, the exemplary processes may be executed by a computing system in communication with a vehicle computing system. Such a system may include, but is not limited to, a wireless device (e.g., and without limitation, a mobile phone) or a remote computing system (e.g., and without limitation, a server) connected through the wireless device. Collectively, such systems may be referred to as vehicle associated computing systems (VACS). In certain embodiments, particular components of the VACS may perform particular portions of a process depending on the particular implementation of the system. By way of example and not limitation, if a process has a step of sending or receiving information with a paired wireless device, then it is likely that the wireless device is not performing that portion of the process, since the wireless device would not "send and receive" information with itself. One of ordinary skill in the art will understand when it is inappropriate to apply a particular computing system to a given solution.

Execution of processes may be facilitated through use of one or more processors working alone or in conjunction with each other and executing instructions stored on various non-transitory storage media, such as, but not limited to, flash memory, programmable memory, hard disk drives, etc. Communication between systems and processes may include use of, for example, Bluetooth, Wi-Fi, cellular communication and other suitable wireless and wired communication.

In each of the illustrative embodiments discussed herein, an exemplary, non-limiting example of a process performable by a computing system is shown. With respect to each process, it is possible for the computing system executing the process to become, for the limited purpose of executing the process, configured as a special purpose processor to perform the process. All processes need not be performed in their entirety, and are understood to be examples of types of processes that may be performed to achieve elements of the invention. Additional steps may be added or removed from the exemplary processes as desired.

With respect to the illustrative embodiments described in the figures showing illustrative process flows, it is noted that a general-purpose processor may be temporarily enabled as a special purpose processor for the purpose of executing some or all of the exemplary methods shown by these figures. When executing code providing instructions to perform some or all steps of the method, the processor may be temporarily repurposed as a special purpose processor, until such time as the method is completed. In another example, to the extent appropriate, firmware acting in accordance with a preconfigured processor may cause the processor to act as a special purpose processor provided for the purpose of performing the method or some reasonable variation thereof.

While many original equipment manufacturers (OEMs) have taken it upon themselves to provide a level of infrastructure for charging the EVs that they sell, the ability of these businesses to keep up with growing EV demand may be taxed. Since these companies are not traditionally in the business of fuel/infrastructure provision, significant resources would be needed to provide an adequate network of stations. Moreover, there would be an incentive to create customer-only charging points, which would be an inefficient use of available space, especially when a particular OEM's customers did not need the charging resource at any given time.

Cooperation between such entities can go some distance towards solving the problem, but it would also be useful to have the free market intervene and provide paid charging resources similar to how gas stations provide fuel to vehicles of all makes. Absent coordination between drivers and charging points, however, the incentives for entry into this market may be limited, because it may be difficult to plan for EV demand requirements and to notify possible customers of available EV charging resources.

Some stations may find themselves overwhelmed if the local population adopts EVs at a high rate, and other stations, sometimes only a few miles distant, may be completely under-used because potential customers do not know about the possible alternatives. Modern drivers also like to have a plan not to run out of fuel, and the common paradigm of simply assuming that a refueling/recharging point will be more-or-less available, as needed, may not yet be a suitable approach to EV travel.

Finally, given the longer wait times associated with EV charging, drivers may change exhibited preferences for behavior at recharging stations, which can also lead to inefficient usage of resources. In the gasoline-based paradigm, people frequently want to complete refueling as swiftly as possible, which creates suitable throughput for even the busiest stations. If someone is forced to wait for 20 minutes, however, they may decide that waiting for 30 minutes is not a great burden, in order to prevent some future wait at another station. That can lead to overcharging, in the sense that they obtain more charge than necessary to reach, for example, a home location where charging is free and imposes no personal burden. This would not generally be a problem, except that this excessive additional waiting can deprive another user of a charging resource that may be more needed by the other user.

Excessive waiting may also be bad for station owners, as one driver charging for an extra 10 minutes may deprive the station owner of a different customer who would charge for 20 or 30 more of the next-minutes.

The illustrative embodiments work to solve many of these issues and create an efficient deployment of resources throughout a theoretically disconnected charging network. They serve to increase user assurances about timely route completability, create better resource utilization, increase throughput and generally increase the utility of the existing charging network, as well as creating increased incentive for additional participation.

Figure 1:
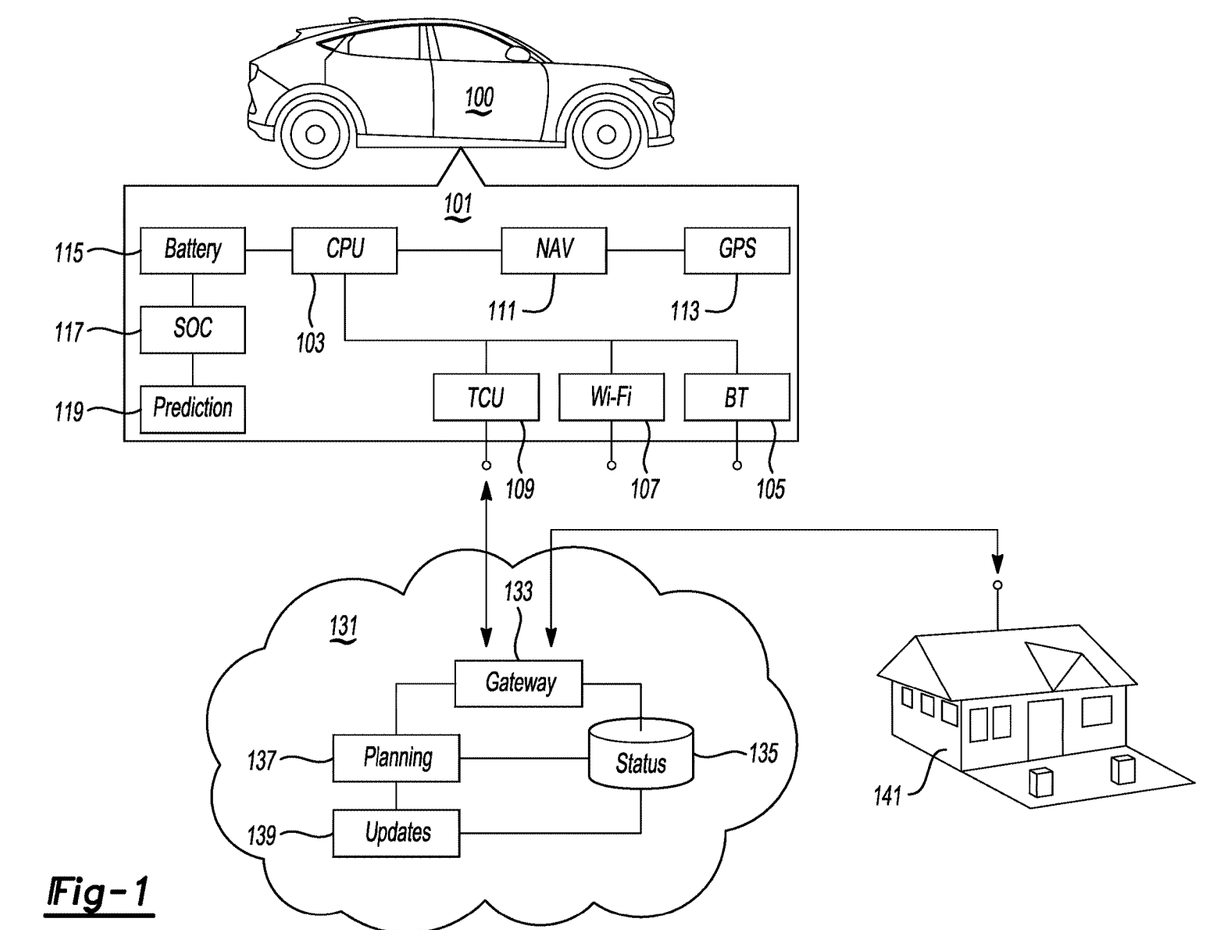
FIG. 1 shows an illustrative vehicle, cloud and charging point coordination system.

FIG. 1 shows an illustrative vehicle, cloud and charging point coordination system. In this example, an EV 100 includes an onboard computing system with one or more processors 103 and a variety of communication mediums available thereto. These include, for example, BLUETOOTH transceiver 105, Wi-Fi transceiver 107 and a telematics control unit (TCU) 109, capable of cellular long-range communication.

Through these communication mediums, vehicles can communication with local infrastructure and backend planning services, such as those shown by example in the cloud 131. User travel plans can be shared and accommodated, and spot-changes in charging availability can be provided to vehicles to provide up-to-date information about time-saving options while a journey is in progress. User behavior models may change over time too, as users realize, at least for the time being, that taking a 10 minute detour now to use a necessary 30 minute charge is ultimately more efficient in many cases than waiting 20 minutes at some future charging point for a comparable charge. But those users would require the knowledge of the opportunity in order to exercise the opportunity.

Vehicle navigation systems 111 can store a current charging-route as well as accommodate future opportunities. Vehicle coordinates, obtained from a GPS receiver 113, can be provided to the backend 131 and can serve as the basis for distribution of immediately available slots. Slot information can be distributed by system preference as well, based on battery 115 state of charge 117 to first provide immediate space knowledge to those most in need of charging. That can help prevent situations where a vehicle actually runs out of charge. Prediction planning algorithms 119 can indicate likely SOCs at future travel points, allowing for accommodation of changes and distribution of information in a forward-looking manner. For example, if a station 141 has a 1 hour window become available, the station can first try to fill the slots with local vehicles, and then determine which vehicles 100 will have a low SOC when they arrive near the station in 20 or 30 minutes, as those are suitable candidate vehicles for booking the available slot.

All of this information sharing and planning creates an accommodative network that allows for more continual usage of charging resources and prioritizes the neediest vehicles. Moreover, discounts can be offered for usage of underused slots, vehicles can be limited to short charges in high demand times (needier drivers are more likely to agree to usage of shorter time slots, provided those slots can provide at least sufficient power to reach a next-charge), and drivers who over-use a slot can be charged increased pricing in order to incentivize them to free up resources. While incentives are not a necessary element in every possible form, at least, they can be used to encourage changes in behavior in a manner that better utilizes resources for the group over the wants of individual users.

The cloud can include a gateway 133 for request and response handling, which in this case can include, for example, availability requests from vehicles 100, scheduling requests from vehicles 100 and to stations 141, availability information receipt from stations 141, etc. The cloud can also provide planning and information sharing based on the collection of available data. A status 135 database can track reservation availability, historical availability, and other station metrics and static data, such as locations, hours of operation, prices, etc.

A planning process 137 can receive information about an upcoming or present journey from the vehicle 100 and utilize the current status of stations proximate to one or more possible routes to assist a driver of the vehicle 100 in ensuring charging coverage throughout the route. Updates to station statuses can be distributed by an updates process 139, which may prioritize update delivery based on needs, etc. Driver metrics can also be used to qualify drivers for updates, and preference may be given to drivers who exhibit a more collectively cooperative attitude—e.g., such as drivers who stick within assigned time limits and maximum charge request limits. Preferential distribution is not necessary for any implementation, but providing the resource identification to drivers who are most in need and/or who are most cooperative may tend to produce more overall efficient results.

Figure 2:
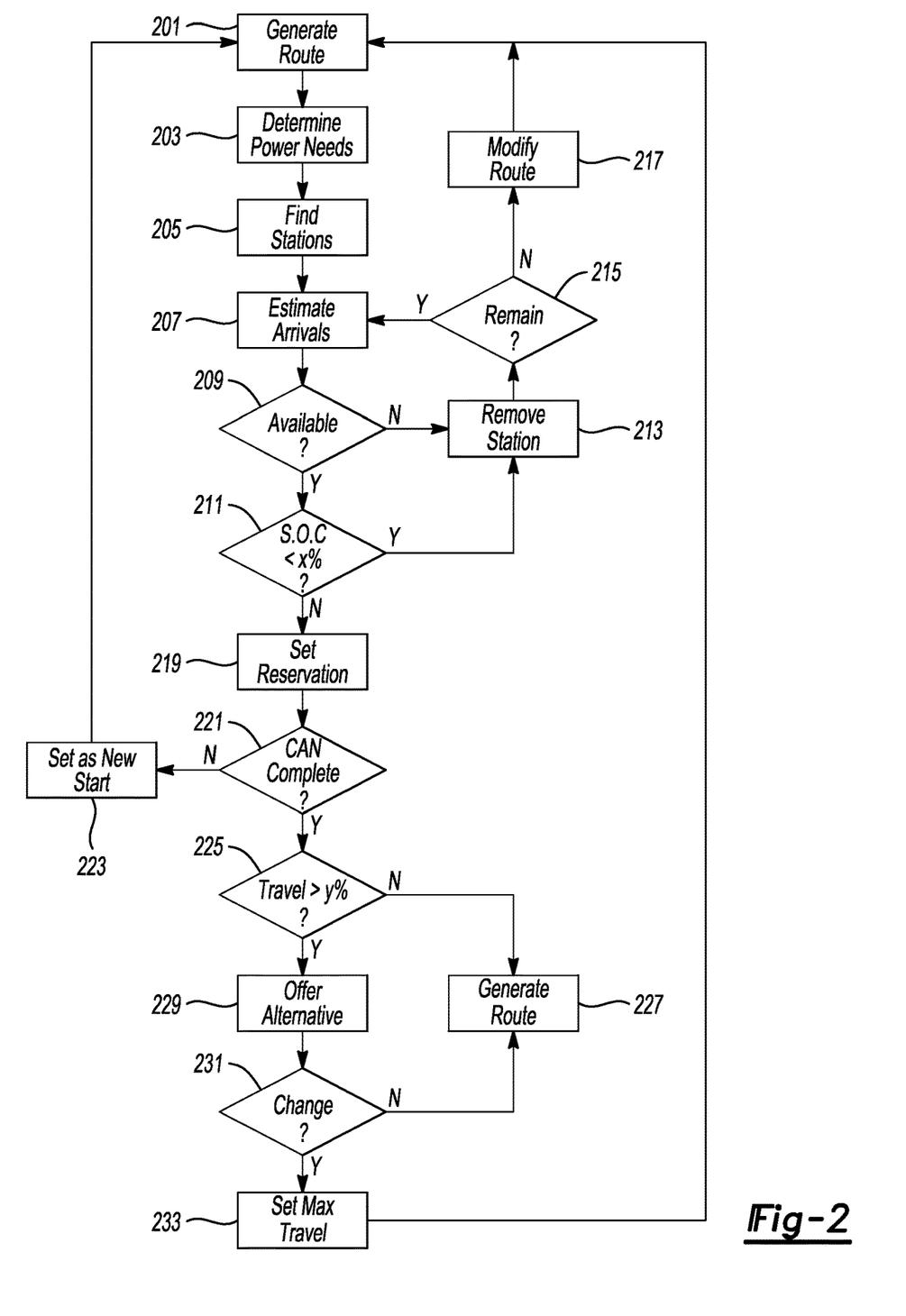
FIG. 2 shows an illustrative process for route planning with charging.

FIG. 2 shows an illustrative process for route planning with charging. In this example, a vehicle route planning process will work through available charging along a route to confirm that charging needs are capable of being met at points along the route, to help ensure route completion and prevent a driver from running out of power. It may be always possible to plan some form of route, if delay and detour is not a concern, but most drivers would prefer not to spend 3 hours on a route that should be 45 minutes, so the process will also attempt to accommodate timing constraints to allow drivers to finish routes within some relative threshold difference between a fastest possible route.

In this example, the process generates a route, or a plurality of routes at 201. While a typical routing process may generate a fastest route, shortest distance route, etc., this process will be focused on ensuring a customer can complete a route without running out of charge and/or keeping charge above a threshold. Since customers will still likely prefer the fastest or shortest routes, the process may generate both those routes first (if different).

At 203, the process determines the power needs of the vehicle 100 to travel the route. This can include, for example, determining that a vehicle can fully complete a route with present power and have sufficient power remaining. In that instance, the route may suggest recharging stops if there are significant unused slots along the way, and a user may even be offered a discount to power up at that time in order to both prevent a greater need at a later time, when there are fewer slots, and to fully use station resources, but the route does not need to accommodate for the possibility that the user may run out of power or run significantly low on power.

On the other hand, if at least one recharge is needed, e.g., if the vehicle is projected to fall below a threshold power before completing the route, then the route process may find one or more stations along the way at 205 that have at least one available spot proximate to a user estimated time of arrival (ETA), estimated at 207 for each identified station. It is worth noting that the slot need not to be proximate to a point where power is low, but rather any station that can provide a partial or full amount of the recharge needed may be considered, provided the battery remains below 100% after the charge. That allows for pre-obtainment of power prior to a need.

This is somewhat of a deviance from a common paradigm used by drivers who drive gasoline powered vehicles. Those drivers tend to wait until a tank is more than X percent empty, because of the general prevalence of gas stations. But, when station access is at a premium and may not always be available, it can be wise to plan the power needs of a full route in advance and obtain power when it happens to be available, not just when the present charge state indicates an immediate or likely need.

Once ETAs for one or more stations are calculated at 207, the process determines if there are available time slots at those stations within a temporal proximity to the ETA (e.g., a wait of no more than X minutes). X can be driver configurable or be set by a system as a baseline, and drivers who are willing to wait a little longer may have a much wider variety of options from which to choose in any event. The process can repeat consideration of stations and removal of those with no open slots at 213 until no stations remain at 215 and/or at least one suitable station is found at 209.

The process may simply find one suitable station at 209, or more than one. Finding extra stations at 209 provides some greater flexibility later, because this may just be the first recharge leg in a multiple recharge journey, and a given station may not provide sufficient power for a next-station trip.

Also, in this example, the process contemplates the max remaining SOC at 211, after charging is completed. That is, for example, if a charging results in an SOC that is below a minimum threshold even after charging, because of a small timeslot, for example, that station may not be a suitable candidate, as another stop may be required in too close of a proximity to the original stop.

If the station passes the initial considerations, the process may set a temporary reservation of a timeslot at 219. This allows the process to temporarily reserve slots while it completes analysis of a journey, so that the process doesn't conclude the analysis only to find an initial slot no longer available. How long the temporary reservation may be held, or whether it may even be held, is a matter for negotiation between stations and a planning entity, and may vary from station to station based on aggregate demand (high-demand stations may prevent it, low-demand stations may allow it to be for unlimited duration, for example).

Based on the obtainable charge from the current station under consideration, the process then determines whether the journey can be completed with the obtainable charge. If yes at 221, then a suitable candidate station or set of stations has been found. If not, the process sets the current station as a new "start point" at 223 and repeats the process for at least a next leg of the journey based on whatever charge is projected to exist after charging at the current station under consideration. This allows for iterative route building and contemplate of changing charge states. It also allows for varied accommodation of plans—e.g., if 180% of charge is needed from a vehicle that starts at 50% charge, the vehicle can add 130% of total capacity under a variety of strategies without be constrained to a single plan, since each plan would accommodate the resulting charge from each proposed station and whether a next-proposed station can be reached on that charge or which next-proposed stations can be reached.

If no stations remain in a given iteration at 215, that is, if there is no station with available slots that can also provide sufficient charge to reach a next station, the process may have to modify the route at 217 to choose one or more alternative routes with different charging options. This does not necessarily require building a whole new route, and the modification may be for portions of the route that pass through high-demand areas and/or areas with very few charging options. For example, if cities tend to have a lot of options, but a portion of the route passes 30 miles outside the city, branching the route towards the city may be all that is required, and that may be a necessity based on the SOC when the vehicle is near the city.

Finally, this process considers the resulting route once a plan is formulated at 225. The consideration contemplates, for example, whether the total travel time or distance is greater than Y % of the fastest or shortest routes. Using the prior example about branching to cities, a cross-country route could include seven such branches, each adding 50 miles of total travel, in addition to other deviances. That may be an unacceptable total deviance from the fastest route, and so an alternative route that is less direct, but with fewer branches, may be offered as an alternative at 229. That is a "net faster" route, it just may involve travel on some less traveled roads (where charging may still be available but very low demand). Operators of those alternative stations may also be willing to offer discounts, so it would be a win-win for the driver, who gets a slightly faster route because of excessive demand on the main route, and who also saves money on charging at the lower-demand stations.

The process may not know of the exact alternative route at 229, but instead could offer the option in light of the excessive travel on the main route, and the user could elect "yes". The process would then set a max travel distance or time at 233 and explore alternative options with the set constraint. Otherwise, the user could accept the route at 231 and the process could lock-in the reservations and generate the route. At that point, the user knows both the full correct route and that every time charging is needed, it is reserved.

The prior process is especially useful if more than one stop is projected to be needed. It can also be used for single stop plans, and an example of the determinations that lead to both situations follows. It may also be the case that a single stop plan is theoretically possible, but limited resources make that plan impractical, in which case the system can accommodate by planning a multi-stop route. This can save users who may think they only need a single stop based on known travelable distance and a known charging point location—if they arrive at the charging point and find all reservations booked for hours, that is not an optimal route.

If the vehicle only needs one stop, i.e., if it is possible to recharge the vehicle once and reach the destination with threshold power remaining, based on, for example, current vehicle charge and a maximum charge, the process may attempt to find a location where the obtainable maximum charge can be obtained (based on availability) and where the obtainable maximum charge, at that point in the journey, provides sufficient remaining charge to complete the journey.

The total amount of charge available based on the current charge and a single recharge will vary based on where the user is in a journey. For example, if the user has 70 percent charge and requires 140 percent of a total charge to complete the journey with a threshold power level remaining, the user will need to use up at least 40 percent of the charge prior to recharging. At any point prior to that, e.g., when 20 percent has been used, a full charge will be insufficient to complete the journey because the user can only charge the vehicle to a maximum. I.e., the user will use 20 percent and have 50 percent remaining. The user will charge to 100 percent. The total amount of charge available then (from the initial point), will be the 20 percent used to reach the charging point and the 100 percent after leaving the charging point, which is only 120 percent, which is insufficient to complete the journey.

For a scenario where the system is attempting to have the user only make a single stop because a single stop will theoretically suffice, the process will begin looking for a charging station at least a threshold distance into the journey. In the above example, the threshold would be once the user has used at least 40 percent of the charge. To the extent that the charging point is not immediately adjacent to a route, the system will also have to accommodate travel to and from the charging point back to the route, so the total necessary state of charge may be adjusted to, for example, 145 percent for a single station that requires 5 percent charge for a deviation to the station. In that instance, the user should reach the station after having used no less than 45 percent of the charge.

The process can thus begin searching at points within a close proximity to the route at locations past where the user has used 40 percent of the charge, and expand the travel distance, from the route to the stations, as the search progresses down the route. Any deviance to the station will be bounded by and upper and lower requirement, requiring the noted minimum amount of charge used to reach the station and requiring no more than the 70 total percent of charge available. The numbers may also be adjusted by a desire to leave some minimum threshold charge in the vehicle when planning, in case unexpected delays or charge usage (e.g., heavy accessory usage) occur.

Even when a station is found, the process will confirm that the requisite amount of charge can be obtained based on available charging. This also represents a good opportunity to utilize under-utilized charging points—while a user may have to travel slightly more off-route location, that location may have a timeslot long enough to accomplish a full charge. For that particular user, this stop may be desirable because it is only a single stop or, for example, it actually saves time by preventing successive shorter stops. The user may also be offered a discount for using the underutilized charging resource.

If multiple stops are required, then the process may proceed as in FIG. 2 or in similar fashion. There are many reasons multiple stops may be required, such as a total amount of power required exceeding current charge+100 percent (or, for example, +80 percent if there is a desired threshold 20 percent charge remaining), unavailability of long-duration charging stops along a route, distance from route to various available charging stops increasing power consumption, etc.

Figures 3, 4:
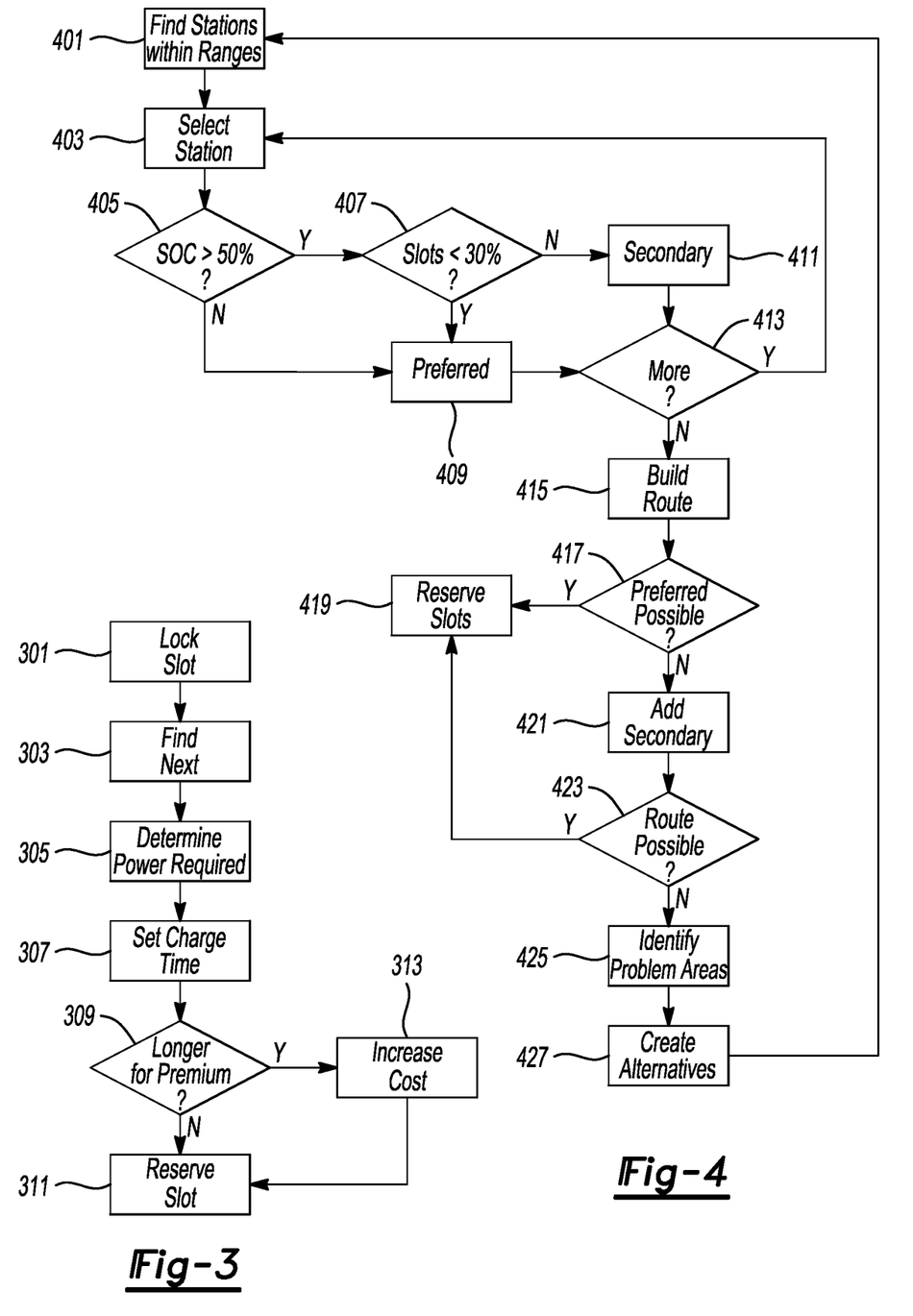
FIG. 3 shows an illustrative iterative station selection process with next-stop confirmation.
FIG. 4 shows an illustrative charging-route planning process with load balancing.

FIG. 3 shows an illustrative iterative next station selection process. This is an example of a process that can be used to select any station along a route, once at least two consecutive stations along a route have been determined. It may be more useful to determine all stations with slots at approximate ETAs, but ETAs will also change based on how long is spent at a prior station. Another way to contemplate the problem would be the total projected amount of wait and charge time, and then adjust every ETA to an ETA window based on how much wait and charge time has been already utilized.

In this example, the process locks in a time slot at least temporarily at 301 while it tries to find a next station along a route. This is an example of when a temporary reservation hold may be useful. The process then determines a next station at 303.

In order to prevent stopping in too short of intervals, at least initially, the process may start by selecting next-stations based on, for example, at least an hour of travel time, or some distance of travel time. From those stations, a suitable station with an open slot is selected as a next station at 303.

The process also determines how much power is required to reach the next-station at 305, and/or net power requirements for the remaining journey. A charge time is set at 307 that at least provides the ability to reach a next-station with more than a threshold amount of power remaining. This can be equal to a pre-fixed window (e.g., 30 minutes, 60 minutes, etc.) or more dynamic calculation based on charge rates and power projection needs for a next station. It may be more convenient, perhaps, to reserve charging in fixed time blocks, at present, but for instances like high-demand stations with long waits, the owners may prefer to throughput more vehicles. Having a vehicle not overcharge may also allow another vehicle, more in need of a charge, to obtain necessary power.

In at least one instance, a user may be able to use a space longer than needed for a premium at 309. For example, a user may be able to overcharge a vehicle beyond some threshold need indicated by the system, but only if the user pays a premium (the premium payment is not necessary, simply contemplated here). This may allow a user to take a lunch break, nap in their car, etc., while charging. Accordingly, some users may want to overcharge their vehicles, and may be willing to pay to do so, since it may create fewer necessary stops along a route. This may be even more incentivized when one or more necessary stops was some distance off-route.

The system could tell the user of a planned charge time that will reach the next station, and then an incremental price for a longer charge. The system could also indicate any time-saving (e.g., preventing a future stop or deviation) achieved by the longer charge. Users who are not going to achieve any particular gain may not be likely to accept the option, but someone who is saving a 45 minute detour and charge stop may be interested. Since the amount of time spent actually charging at either stop may be more or less the same (if the same type of charging is used), the primary consideration may be the amount of detour driving that is prevented. In some instances, the overcharge option may not even be offered unless the user is going to save a threshold amount of detour driving time with respect to a future planned stop.

If the user accepts the extended charge option at 309, the process can increase the price of charging for the longer period (the increase being a per unit of time or unit of charge increase, and not simply a linear increase accommodating the longer duration). Otherwise, the process will reserve the locked reservation at 311 (having confirmed that the next stop can be reached based on suitable charge being able to be obtained). The process may also, at this time, lock the determined usable reservation at a next-station and repeat the process with regards to a 3$^{rd}$ station.

In other instances, the process may complete a full route determination in order to ensure the whole route can be completed, before confirming any locked reservation slots. How the implementation occurs may be a function of, for example, how long a slot can be locked but not confirmed, relative to the amount of time it takes the process to complete a full route evaluation. While the evaluation process may be swift in human terms—i.e., it might be "long" for a computer but fast for a human, there may also be significant demand for open slots when charging inventory is low, and so, for example, a slot may be held for no more than 30 seconds while a process completes and during human interactions throughout the process (such as confirming overcharges or route changes). The duration of a hold timer may also be a function of immediate demand, and range based on whether or not other route plans may need the slot or a slot at the station.

FIG. 4 shows an illustrative charging-route planning process with load balancing. This illustrative process attempts to balance needs and station usage (loads) to better utilize a network. Accordingly, vehicles with greater immediate need may be prioritized for certain slots, but, at the same time, vehicles with lesser needs may be given discounts to travel to other stations. If a perception of unfairness were an issue, vehicles that were "bumped" from a slot at one point in time (where the slot notification was sent to one vehicle, but not another) could accrue some form of cooperation credit that would qualify them for some future notification as though they were low on power, for example. While not necessary, some accommodation like this would prevent people from being incentivized to continually run below a threshold power state in order to ensure full notification of and access to available charging slots. Of course, there is also an inherent chance in such operation that no slots will be available and the vehicle will run out of power.

In this example, the process identifies one or more stations within a travelable range and along a planned route at 401. This can include, for example, stations within a predefined proximity to the route. The proximity may vary with total journey time, need of the driver, availability of stations or station density for an area (fewer stations may require larger proximity), etc.

From the determined stations, the process may select a station at 403. In this example, the process determines if a vehicle SOC will be above a threshold upon arrival at 405, which in the example is 50%. That is, if the vehicle will not be above 50% SOC upon arrival, the station is designated as "preferred" at 409. If the vehicle will be above 50%, indicating likely diminished need, then the consideration may also accommodate station demand at the ETA. If the demand for slots is below a threshold, in this example, 30%, at 407, the process may also flag the station as preferred, because the more-charged customer will not likely be taking a slot from someone in greater need.

It is also possible to override these designation factors based on aggregate route need, for example. If a user will arrive at a crowded station above 50% charge, then the process may typically designate that station as a secondary station at 411. But, if the planned next station that user can access will be accessed at, for example, below 20% charge, then that user has an argument that they have as much need as anyone else. That is because if the user does charge at the first station, they will still only be at 20% charge by the time they reach the next station, and if the user does not charge, they may run out of power between the stations, if there are no alternative charging points. So, in certain instances, even users with relatively full power may have a need comparable to that of other lower-charge users.

Also, the threshold for slot consideration may vary inversely with time until ETA. That is, the longer time away the user is, the lower the percentage may be for considering the station to be "likely empty." So a user two hours distant may require an estimated slot usage of only 20% or less, but a user thirty minutes away may only require an estimated slot usage of 50%. The slot usage mentioned is the threshold for designating a station as secondary when a vehicle has sufficient power upon a projected arrival. The variance recognizes that 30 minutes out, the state of most slots for the next 30 minutes is more likely already resolved than the state of slots at a stop 2 hours away. ETAs may also be compared to historical usages at certain times of day or days of the week, in order to adjust these averages to more closely match expected demand.

In this example, the process repeats until no more stations remain at 413. If a route cannot be completed with preferred stations, some number of secondary stations may be used. Since the concept is group-centric not user-centric, the route using secondary stations may actually be a better route. Since the route building can use "secondary" designated stations, this may also accommodate the needs of vehicles like the one in the example (with 50% SOC but enhanced "need") because those secondary stations would still be ultimately chosen in the absence of a preferred station option. Accordingly, it may not be necessary to accommodate the thresholds in the manner described, although such accommodation is certainly possible.

Once all stations have a designation, the process considers or builds the route at 415, which can include a plurality of routes running through various primary and secondary station stops, along with ETAs for those stops, charge obtainable at those stops, etc. Using the possible route or routes, the process determines if at least one of these routes runs only through preferred stations at 417. In this example, a preferred route is a route that doesn't use high demand resources unless the vehicle is in a state of need, and therefore effectively load balances usage of charging resources. If the preferred route is possible at 417, the process reserves those slots at 419 and can provide the driver with a route that is beneficial for the group and the driver.

If the preferred route is not possible, the process may consider routes running through one or more secondary charging points at 421, as those points are still technically available, but there may be some competition for limited resources at those stops. If at least one of those routes is possible at 423, the process again reserves the slots. In this example, the process may start with a route using the least number of secondary charging points and work until it finds a complete route.

If no route is possible, the process can determine "dead zones" at 425. These can include areas with waits longer than a threshold, areas deficient in charging resources, etc. In the former instance, for example, an alternative may be to depart at a different time, as the resources may be plentiful at certain locations, but also in high demand. In the latter instance, the process may have to create a new route running past areas with higher station density. Possible alternatives can be created at 427 and the process can repeat route creation to confirm a full route is possible with the alternatives. These can then be presented to the user as alternative choices.

Through use of information sharing, resource monitoring, balanced planning and consideration of a large group of needs, the illustrative embodiments solve a number of issues that may exist in a landscape of limited charging resources. Since they also can create incentives for market participation, by encouraging use of resources that may be slightly off-route, the embodiments can also help create a longer-term solution that requires less deviation and planning.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to strength, durability, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method comprising:
   determining that at least two charging stops are projected to be required to complete travel along a planned route;
   determining a first charging stop, within a first predefined proximity of the planned route and reachable based on a current charge of a vehicle;
   determining a plurality of second alternative charging stops, each within a second predefined proximity of the planned route and reachable from the first charging stop based on at least a maximum usable charge of the vehicle;
   for each second charging stop, determining a minimum vehicle charge required to reach a respective second charging stop from the first charging stop;
   determining which of the second charging stops are achievable, based on both the minimum vehicle charge required for each of the respective second charging stops and whether the minimum vehicle charge can be achieved by the vehicle through charging at the first charging stop using a reservation window available at the first charging stop, based on comparing available reservation time available at the first charging stop to minimum charge time needed to reach each respective second charging stop;
   selecting one of the achievable second charging stops;
   reserving charging at the first charging stop during the reservation window for at least a duration projected to be sufficient to achieve the minimum vehicle charge required to reach the selected achievable second charging stop; and
   modifying the planned route to include stops at the first charging stop and the selected achievable second charging stop.

2. The method of claim 1, wherein the first and second predefined proximities are the same.

3. The method of claim 2, wherein the first and second predefined proximities are based on a user-defined maximum deviation from the planned route.

4. The method of claim 1, wherein the maximum usable charge is less than a maximum charge by a predefined threshold amount of charge.

5. The method of claim 1, wherein the minimum vehicle charge required includes both an amount of charge required for travel between the first charging stop and the respective second charging stops and a predefined threshold amount of minimum charge.

6. The method of claim 1, wherein, responsive to determining that a plurality of the second charging stops are achievable, the selecting is based at least in part on a known demand at an estimated time of arrival at each respective one of the plurality of the second charging stops, the known demand indicated at least in part by at least one of current reservations spanning the estimated time of arrival or historic reservations spanning a time of day equal to the estimated time of arrival.

7. The method of claim 6, wherein the selecting includes selecting the achievable second charging stop based at least in part on the known demand for the selected achievable second charging stop being below a predefined threshold demand.

8. The method of claim 1, wherein, responsive to determining that a plurality of the second charging stops are achievable, the selecting includes selecting the one of the achievable second charging stops based on a total projected stopping time associated with the first charging stop used in conjunction with the selected achievable second charging stop being shorter than total projected stopping times associated with the first charging stop used in conjunction with others of the plurality of achievable second charging stops.

9. The method of claim 1, wherein, responsive to determining that a plurality of the second charging stops are achievable, the selecting includes selecting the one of the achievable second charging stops based on a projected price associated with the first charging stop used in conjunction with the selected achievable second charging stop being cheaper than projected prices associated with the first charging stop used in conjunction with others of the plurality of achievable second charging stops.

10. The method of claim 1, wherein, responsive to determining that a plurality of the second charging stops are achievable, the selecting includes selecting the one of the achievable second charging stops based on a distance traveled associated with the first charging stop used in conjunction with the selected achievable second charging stop being less than distances traveled associated with the first charging stop used in conjunction with others of the plurality of achievable second charging stops.

11. A non-transitory computer-readable storage medium, storing instructions that, when executed by a processor, cause the processor to perform a method comprising:
   a) determining that at least two charging stops are projected to be required to complete travel along a planned route;
   b) determining a first charging stop, within a first predefined proximity of the planned route and reachable based on a current charge of a vehicle;

c) determining a plurality of second alternative charging stops, each within a second predefined proximity of the planned route and reachable from the first charging stop based on at least a maximum usable charge of the vehicle;

d) for each second charging stop, determining a minimum vehicle charge required to reach a respective second charging stop from the first charging stop;

e) determining which of the second charging stops are achievable, based on both the minimum vehicle charge required for each of the respective second charging stops and whether the minimum vehicle charge can be achieved by the vehicle through charging at the first charging stop using a reservation window available at the first charging stop, based on comparing available reservation time available at the first charging stop to minimum charge time needed to reach each respective second charging stop;

f) selecting one of the achievable second charging stops;

g) reserving charging at the first charging stop during the reservation window for at least a duration projected to be sufficient to achieve the minimum vehicle charge required to reach the selected achievable second charging stop; and h) modifying the planned route to include stops at the first charging stop and the selected achievable second charging stop.

12. The storage medium of claim 11, wherein the method further includes repeating at least steps b-h for one or more consecutive additional stops following the selected achievable second charging stop to complete the route including one or more consecutive achievable stops following charging at the selected achievable second charging stop.

* * * * *